(12) United States Patent
Miller et al.

(10) Patent No.: US 12,204,495 B1
(45) Date of Patent: Jan. 21, 2025

(54) UTILIZING STRUCTURED LOGS OF DECLARATIVE COMPUTING ENVIRONMENTS

(71) Applicant: International Business Machines Corporation, Armonk, NY (US)

(72) Inventors: Scott Miller, Meadville, PA (US); Joseph Evan Dunn, Tucson, AZ (US)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 18/217,444

(22) Filed: Jun. 30, 2023

(51) Int. Cl.
G06F 16/16 (2019.01)
G06F 16/13 (2019.01)
G06F 16/14 (2019.01)
G06F 16/172 (2019.01)

(52) U.S. Cl.
CPC ............ *G06F 16/164* (2019.01); *G06F 16/13* (2019.01); *G06F 16/148* (2019.01); *G06F 16/172* (2019.01)

(58) Field of Classification Search
CPC ...... G06F 16/164; G06F 16/148; G06F 16/13; G06F 16/172
USPC ................................. 707/822, 602; 711/154
See application file for complete search history.

(56) References Cited

U.S. PATENT DOCUMENTS

| | | | |
|---|---|---|---|
| 9,516,053 B1 * | 12/2016 | Muddu | G06F 16/9024 |
| 9,811,546 B1 * | 11/2017 | Bent | G06F 16/2228 |
| 11,308,035 B2 * | 4/2022 | Prahlad | G06F 3/0649 |
| 11,372,868 B2 | 6/2022 | Reddekopp et al. | |
| 11,573,973 B1 * | 2/2023 | Vishnoi | G06F 16/254 |
| 11,922,157 B2 * | 3/2024 | Sharpe | G06F 11/201 |
| 2004/0098415 A1 * | 5/2004 | Bone | G06F 16/10 |
| 2011/0167014 A1 * | 7/2011 | Zhang | G06F 16/958 715/764 |
| 2017/0109683 A1 * | 4/2017 | Carbonell | G06F 16/24573 |
| 2022/0334725 A1 * | 10/2022 | Mertes | G06F 16/275 |
| 2022/0374218 A1 * | 11/2022 | Monteiro Vieira | G06F 21/577 |

OTHER PUBLICATIONS

Ekelhart et al., "The SLOGERT Framework for Automated Log Knowledge Graph Construction," The Semantic Web: 18th International Conference (ESWC), Jun. 2021, pp. 1-16.
Redhat, "Gathering data about your cluster," Red Hat OpenShift, 2023, 29 pages, retrieved from https://docs.openshift.com/container-platform/4.10/support/gathering-cluster-data.html.
Github, "O Must Gather (omg) v2 (Work in Progress)," GitHub, 2023, 3 pages, retrieved from https://github.com/kxr/o-must-gather.

* cited by examiner

*Primary Examiner* — Giovanna B Colan
(74) *Attorney, Agent, or Firm* — Zilka-Kotab, P.C.

(57) ABSTRACT

A computer-implemented method, according to one approach, includes: receiving a structured log of information, and converting the structured log of information into a filesystem interface. Resources in the information are identified by inspecting the filesystem interface. The identified resources are also translated into an unstructured object by unmarshalling the identified resources. Furthermore, the unstructured object is made available by mapping the unmarshalled resources.

19 Claims, 4 Drawing Sheets

UTILIZING STRUCTURED LOGS OF DECLARATIVE COMPUTING ENVIRONMENTS

BACKGROUND

The present invention relates to declarative computing environments, and more specifically, this invention relates to utilizing structured logs of declarative computing environments.

As computing power continues to advance and the use of IoT devices becomes more prevalent, the amount of data regularly produced continues to increase. For instance, the rise of smart enterprise endpoints has led to large amounts of data being generated at remote locations. Data production will only further increase with the growth of 5G networks and an increased number of connected mobile devices. This has also become more prevalent as the complexity of machine learning models increases. Increasingly complex machine learning models translate to more intense workloads and increased strain associated with applying the models to received data.

In declarative computing environments such as KUBERNETES®, scenarios arise where it is beneficial for users to gather different logs of the computing environment. For example, log collections are conducted in "must-gather" operations, which collect various information into a structured format. However, accessing these log files is significantly limited and inefficient in conventional products. For instance, conventional products only provide access through a command line or file browser, which significantly limits access to desired information. Conventional products thereby do not provide a viable interface for interacting with the resources and leading to users experiencing limited insight into the corresponding environment.

These conventional products are also unable to implement any specific tooling. Accordingly, access tooling from a user is unable to access information collected in logs for post-processing. Additionally, access tooling hardcodes specific resource types and is unable to process dynamic discovery information as a result. It follows that conventional systems have suffered from operational and performance based inefficiencies.

SUMMARY

A computer-implemented method, according to one approach, includes: receiving a structured log of information, and converting the structured log of information into a filesystem interface. Resources in the information are identified by inspecting the filesystem interface. The identified resources are also translated into an unstructured object by unmarshalling the identified resources. Furthermore, the unstructured object is made available by mapping the unmarshalled resources.

A computer program product, according to another approach, includes a computer readable storage medium having program instructions embodied therewith. The program instructions are readable by a processor, executable by the processor, or readable and executable by the processor, to cause the processor to: perform the foregoing method.

A system, according to yet another approach, includes: a processor, and logic integrated with the processor, executable by the processor, or integrated with and executable by the processor. Moreover, the logic is configured to: perform the foregoing method.

Other aspects and implementations of the present invention will become apparent from the following detailed description, which, when taken in conjunction with the drawings, illustrate by way of example the principles of the invention.

DETAILED DESCRIPTION

The following description is made for the purpose of illustrating the general principles of the present invention and is not meant to limit the inventive concepts claimed herein. Further, particular features described herein can be used in combination with other described features in each of the various possible combinations and permutations.

Unless otherwise specifically defined herein, all terms are to be given their broadest possible interpretation including meanings implied from the specification as well as meanings understood by those skilled in the art and/or as defined in dictionaries, treatises, etc.

It must also be noted that, as used in the specification and the appended claims, the singular forms "a," "an" and "the" include plural referents unless otherwise specified. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The following description discloses several preferred approaches of systems, methods and computer program products for viewing and debugging a container orchestration system cluster by utilizing structured logs of a declarative computing environment. Implementations herein are thereby able to reconstruct declarative computing environments using the structured logs. This allows for distributed systems to operate more efficiently than conventionally achievable by reducing compute overhead and latency associated with implementing one or more logs at a particular location. Implementations herein are thereby able to overcome storage based and processing based issues that have plagued conventional systems, e.g., as will be described in further detail below.

In one general approach, a computer-implemented method includes: receiving a structured log of information and converting the structured log of information into a filesystem interface. Structured logs are collected and sent between locations in a distributed data storage system. While conventional products have only been able to provide limited access to these structured logs, converting these logs as described herein allows implementations to interact natively with the information in structured logs of a declarative computing environment. Implementations herein are thereby able to reconstruct declarative computing environments using structured log collections, thereby overcoming storage based and processing based issues that have plagued conventional systems.

The computer-implemented method also includes identifying resources in the information by inspecting the filesystem interface. The type(s) of resources identified from the information in the common filesystem interface entries may vary depending on the implementation. For instance, in some approaches the resources identified include YAML extension files which are identified from the information by progressing through (e.g., scraping) the common filesystem interface entries. Accordingly, identifying resources allows a server to be implemented (e.g., operate) on a local host system.

The computer-implemented method also includes translating the identified resources into an unstructured object by unmarshalling the identified resources. The process of unmarshalling (translating) the identified resources may reveal desired information about the identified resources. For example, unmarshalling an identified resource can reveal a group version kind (GVK) identifier and/or a namespace identifier of the respective resource. The translated resources may thereby be used to convert the structured log originally received into information that is presented in a hostable format, e.g., as will soon become apparent.

The computer-implemented method also includes making the unstructured object available by mapping the unmarshalled resources. In some implementations, mapping the translated resources includes organizing the translated resources by a respective GVK identifier, a respective namespace identifier, or a respective GVK identifier and a respective namespace identifier. Again, conventional products suffer from significantly limited access to information included in a structured log. As a result, conventional products have been unable to effectively access these log files, resulting in significant processing bottlenecks which have reduced efficiency of the conventional products. This is particularly apparent when attempting to utilize logs to reconstruct a given environment. For instance, conventional products are unable to provide a native interface for interacting with resources, and therefore are unable to gain insights into the respective environments. In sharp contrast to these conventional shortcomings, implementations herein are desirably able to interact natively with structured logs of declarative computing environments by developing and mapping the unmarshalled resources, e.g., as will be described in further detail below.

In some implementations, making the unstructured object available includes hosting an application programming interface (API) service configured to provide a user access to the unmarshalled resources. Once again, conventional products suffer from significantly limited access to information included in a structured log. As a result, conventional products have been unable to effectively access these log files, resulting in significant processing bottlenecks which have reduced efficiency of the conventional products. In sharp contrast to these conventional shortcomings, an API service configured to provide a user access to the unmarshalled resources improves the efficiency at which identified resources may be utilized, thereby increasing throughput of the system as a whole.

In different implementations, the structured log received may include information presented in a .tar file, a .zip file, a .yaml file, a directory file, etc. For instance, in some implementations the resources identified may be YAML extension files. Moreover, the YAML extension files may be identified by progressing through the filesystem interface. It follows that implementations herein may be applied to a variety of different structured logs that are received. For example, some operating systems are limited to producing certain types of files. Implementations here are thereby able to improve interfacing with other systems.

In some implementations, a discovery cache is received along with the structured log of information. Receiving the discovery cache allows for resources to be grouped together in some implementations. The discovery cache may thereby be used to determine a short-name and category for each of the identified resources. For example, exemplary approaches use the discovery cache to determine object subresources and additionally serve those subresources by parsing them out of existing files (e.g., .yaml files) in response to determining that one or more subresources are available, e.g., as would be appreciated by one skilled in the art after reading the present description.

In some implementations, identifying resources in the information includes identifying column data formats in the information. The unmarshalled resources may have the same column data formats as a native cluster. Accordingly, by identifying column data formats in the received information, implementations herein are able to apply the same formats to the unmarshalled resources, thereby reducing the number of compute operations are performed in order to access information included in a structured log.

In another general approach, a computer program product includes a computer readable storage medium having program instructions embodied therewith. The program instructions are readable by a processor, executable by the processor, or readable and executable by the processor, to cause the processor to: perform the foregoing method.

In still another general approach, a system includes: a processor, and logic integrated with the processor, executable by the processor, or integrated with and executable by the processor. Moreover, the logic is configured to: perform the foregoing method.

Various aspects of the present disclosure are described by narrative text, flowcharts, block diagrams of computer systems and/or block diagrams of the machine logic included in computer program product (CPP) approaches. With respect to any flowcharts, depending upon the technology involved, the operations can be performed in a different order than what is shown in a given flowchart. For example, again depending upon the technology involved, two operations shown in successive flowchart blocks may be performed in reverse order, as a single integrated step, concurrently, or in a manner at least partially overlapping in time.

A computer program product implementation ("CPP implementation" or "CPP") is a term used in the present disclosure to describe any set of one, or more, storage media (also called "mediums") collectively included in a set of one, or more, storage devices that collectively include machine readable code corresponding to instructions and/or data for performing computer operations specified in a given CPP claim. A "storage device" is any tangible device that can retain and store instructions for use by a computer processor. Without limitation, the computer readable storage medium may be an electronic storage medium, a magnetic storage medium, an optical storage medium, an electromagnetic storage medium, a semiconductor storage medium, a mechanical storage medium, or any suitable combination of the foregoing. Some known types of storage devices that include these mediums include: diskette, hard disk, random access memory (RAM), read-only memory (ROM), erasable programmable read-only memory (EPROM or Flash memory), static random access memory (SRAM), compact disc read-only memory (CD-ROM), digital versatile disk (DVD), memory stick, floppy disk, mechanically encoded device (such as punch cards or pits/lands formed in a major surface of a disc) or any suitable combination of the foregoing. A computer readable storage medium, as that term is used in the present disclosure, is not to be construed as storage in the form of transitory signals per se, such as radio waves or other freely propagating electromagnetic waves, electromagnetic waves propagating through a waveguide, light pulses passing through a fiber optic cable, electrical signals communicated through a wire, and/or other transmission media. As will be understood by those of skill in the art, data is typically moved at some occasional points in time during normal operations of a storage device, such as during access, de-fragmentation or garbage collection, but this does not render the storage device as transitory because the data is not transitory while it is stored.

Figure 1:
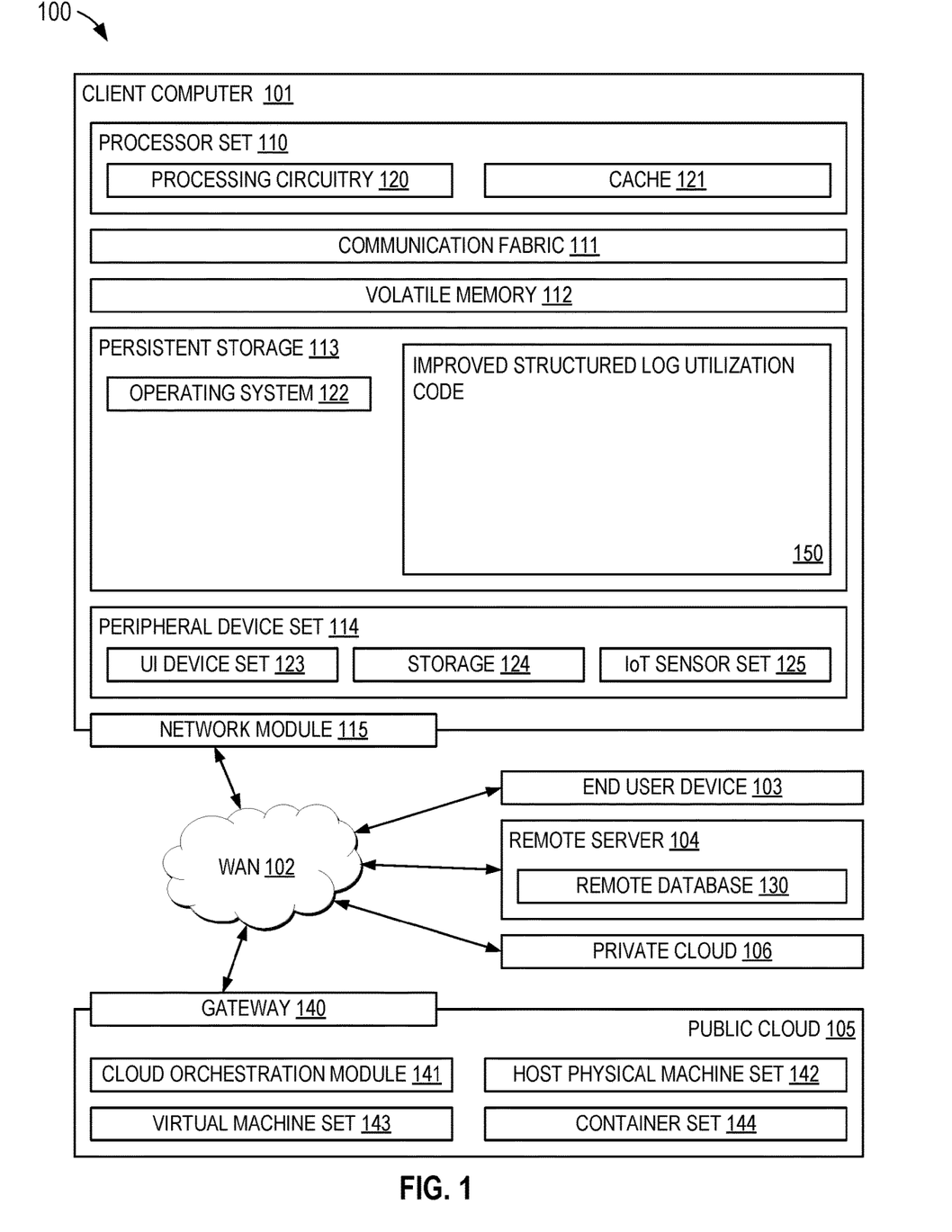
FIG. 1 is a diagram of a computing environment, in accordance with one approach.

Computing environment 100 contains an example of an environment for the execution of at least some of the computer code involved in performing the inventive methods, such as improved structured log utilization code at block 150 for interacting and efficiently processing (e.g., interpreting) structured logs of declarative computing environments, thereby achieving the ability to reconstruct declarative computing environments using structured log collections. In addition to block 150, computing environment 100 includes, for example, computer 101, wide area network (WAN) 102, end user device (EUD) 103, remote server 104, public cloud 105, and private cloud 106. In this approach, computer 101 includes processor set 110 (including processing circuitry 120 and cache 121), communication fabric 111, volatile memory 112, persistent storage 113 (including operating system 122 and block 150, as identified above), peripheral device set 114 (including user interface (UI) device set 123, storage 124, and Internet of Things (IoT) sensor set 125), and network module 115. Remote server 104 includes remote database 130. Public cloud 105 includes gateway 140, cloud orchestration module 141, host physical machine set 142, virtual machine set 143, and container set 144.

COMPUTER 101 may take the form of a desktop computer, laptop computer, tablet computer, smart phone, smart watch or other wearable computer, mainframe computer, quantum computer or any other form of computer or mobile device now known or to be developed in the future that is capable of running a program, accessing a network or querying a database, such as remote database 130. As is well understood in the art of computer technology, and depending upon the technology, performance of a computer-implemented method may be distributed among multiple computers and/or between multiple locations. On the other hand, in this presentation of computing environment 100, detailed discussion is focused on a single computer, specifically computer 101, to keep the presentation as simple as possible. Computer 101 may be located in a cloud, even though it is not shown in a cloud in FIG. 1. On the other hand, computer 101 is not required to be in a cloud except to any extent as may be affirmatively indicated.

PROCESSOR SET 110 includes one, or more, computer processors of any type now known or to be developed in the future. Processing circuitry 120 may be distributed over multiple packages, for example, multiple, coordinated integrated circuit chips. Processing circuitry 120 may implement multiple processor threads and/or multiple processor cores. Cache 121 is memory that is located in the processor chip package(s) and is typically used for data or code that should be available for rapid access by the threads or cores running on processor set 110. Cache memories are typically organized into multiple levels depending upon relative proximity to the processing circuitry. Alternatively, some, or all, of the cache for the processor set may be located "off chip." In some computing environments, processor set 110 may be designed for working with qubits and performing quantum computing.

Computer readable program instructions are typically loaded onto computer 101 to cause a series of operational steps to be performed by processor set 110 of computer 101 and thereby effect a computer-implemented method, such that the instructions thus executed will instantiate the methods specified in flowcharts and/or narrative descriptions of computer-implemented methods included in this document (collectively referred to as "the inventive methods"). These computer readable program instructions are stored in various types of computer readable storage media, such as cache 121 and the other storage media discussed below. The program instructions, and associated data, are accessed by processor set 110 to control and direct performance of the inventive methods. In computing environment 100, at least some of the instructions for performing the inventive methods may be stored in block 150 in persistent storage 113.

COMMUNICATION FABRIC 111 is the signal conduction path that allows the various components of computer 101 to communicate with each other. Typically, this fabric is made of switches and electrically conductive paths, such as the switches and electrically conductive paths that make up buses, bridges, physical input/output ports and the like. Other types of signal communication paths may be used, such as fiber optic communication paths and/or wireless communication paths.

VOLATILE MEMORY 112 is any type of volatile memory now known or to be developed in the future. Examples include dynamic type random access memory (RAM) or static type RAM. Typically, volatile memory 112 is characterized by random access, but this is not required unless affirmatively indicated. In computer 101, the volatile memory 112 is located in a single package and is internal to computer 101, but, alternatively or additionally, the volatile memory may be distributed over multiple packages and/or located externally with respect to computer 101.

PERSISTENT STORAGE 113 is any form of non-volatile storage for computers that is now known or to be developed in the future. The non-volatility of this storage means that the stored data is maintained regardless of whether power is being supplied to computer 101 and/or directly to persistent storage 113. Persistent storage 113 may be a read only memory (ROM), but typically at least a portion of the persistent storage allows writing of data, deletion of data and re-writing of data. Some familiar forms of persistent storage include magnetic disks and solid state storage devices. Operating system 122 may take several forms, such as various known proprietary operating systems or open source Portable Operating System Interface-type operating systems that employ a kernel. The code included in block 150 typically includes at least some of the computer code involved in performing the inventive methods.

PERIPHERAL DEVICE SET 114 includes the set of peripheral devices of computer 101. Data communication connections between the peripheral devices and the other components of computer 101 may be implemented in various ways, such as Bluetooth connections, Near-Field Communication (NFC) connections, connections made by cables (such as universal serial bus (USB) type cables), insertion-type connections (for example, secure digital (SD) card), connections made through local area communication networks and even connections made through wide area networks such as the internet. In various approaches, UI device set 123 may include components such as a display screen, speaker, microphone, wearable devices (such as goggles and smart watches), keyboard, mouse, printer, touchpad, game controllers, and haptic devices. Storage 124 is external storage, such as an external hard drive, or insertable storage, such as an SD card. Storage 124 may be persistent and/or volatile. In some implementations, storage 124 may take the form of a quantum computing storage device for storing data in the form of qubits. In implementations where computer 101 is required to have a large amount of storage (for example, where computer 101 locally stores and manages a large database) then this storage may be provided by peripheral storage devices designed for storing very large amounts of data, such as a storage area network (SAN) that is shared by multiple, geographically distributed computers. IoT sensor set 125 is made up of sensors that can be used in Internet of Things applications. For example, one sensor may be a thermometer and another sensor may be a motion detector.

NETWORK MODULE 115 is the collection of computer software, hardware, and firmware that allows computer 101 to communicate with other computers through WAN 102. Network module 115 may include hardware, such as modems or Wi-Fi signal transceivers, software for packetizing and/or de-packetizing data for communication network transmission, and/or web browser software for communicating data over the internet. In some implementations, network control functions and network forwarding functions of network module 115 are performed on the same physical hardware device. In other implementations (for example, implementations that utilize software-defined networking (SDN)), the control functions and the forwarding functions of network module 115 are performed on physically separate devices, such that the control functions manage several different network hardware devices. Computer readable program instructions for performing the inventive methods can typically be downloaded to computer 101 from an external computer or external storage device through a network adapter card or network interface included in network module 115.

WAN 102 is any wide area network (for example, the internet) capable of communicating computer data over non-local distances by any technology for communicating computer data, now known or to be developed in the future. In some implementations, the WAN 102 may be replaced and/or supplemented by local area networks (LANs) designed to communicate data between devices located in a local area, such as a Wi-Fi network. The WAN and/or LANs typically include computer hardware such as copper transmission cables, optical transmission fibers, wireless transmission, routers, firewalls, switches, gateway computers and edge servers.

END USER DEVICE (EUD) 103 is any computer system that is used and controlled by an end user (for example, a customer of an enterprise that operates computer 101), and may take any of the forms discussed above in connection with computer 101. EUD 103 typically receives helpful and useful data from the operations of computer 101. For example, in a hypothetical case where computer 101 is designed to provide a recommendation to an end user, this recommendation would typically be communicated from network module 115 of computer 101 through WAN 102 to EUD 103. In this way, EUD 103 can display, or otherwise present, the recommendation to an end user. In some implementations, EUD 103 may be a client device, such as thin client, heavy client, mainframe computer, desktop computer and so on.

REMOTE SERVER 104 is any computer system that serves at least some data and/or functionality to computer 101. Remote server 104 may be controlled and used by the same entity that operates computer 101. Remote server 104 represents the machine(s) that collect and store helpful and useful data for use by other computers, such as computer 101. For example, in a hypothetical case where computer 101 is designed and programmed to provide a recommendation based on historical data, then this historical data may be provided to computer 101 from remote database 130 of remote server 104.

PUBLIC CLOUD 105 is any computer system available for use by multiple entities that provides on-demand availability of computer system resources and/or other computer capabilities, especially data storage (cloud storage) and computing power, without direct active management by the user. Cloud computing typically leverages sharing of resources to achieve coherence and economies of scale. The direct and active management of the computing resources of public cloud 105 is performed by the computer hardware and/or software of cloud orchestration module 141. The computing resources provided by public cloud 105 are typically implemented by virtual computing environments that run on various computers making up the computers of host physical machine set 142, which is the universe of physical computers in and/or available to public cloud 105. The virtual computing environments (VCEs) typically take the form of virtual machines from virtual machine set 143 and/or containers from container set 144. It is understood that these VCEs may be stored as images and may be transferred among and between the various physical machine hosts, either as images or after instantiation of the VCE. Cloud orchestration module 141 manages the transfer and storage of images, deploys new instantiations of VCEs and manages active instantiations of VCE deployments. Gateway 140 is the collection of computer software, hardware, and firmware that allows public cloud 105 to communicate through WAN 102.

Some further explanation of virtualized computing environments (VCEs) will now be provided. VCEs can be stored as "images." A new active instance of the VCE can be instantiated from the image. Two familiar types of VCEs are virtual machines and containers. A container is a VCE that uses operating-system-level virtualization. This refers to an operating system feature in which the kernel allows the existence of multiple isolated user-space instances, called containers. These isolated user-space instances typically behave as real computers from the point of view of programs running in them. A computer program running on an ordinary operating system can utilize all resources of that computer, such as connected devices, files and folders, network shares, CPU power, and quantifiable hardware capabilities. However, programs running inside a container can only use the contents of the container and devices assigned to the container, a feature which is known as containerization.

PRIVATE CLOUD 106 is similar to public cloud 105, except that the computing resources are only available for use by a single enterprise. While private cloud 106 is depicted as being in communication with WAN 102, in other implementations a private cloud may be disconnected from the internet entirely and only accessible through a local/private network. A hybrid cloud is a composition of multiple clouds of different types (for example, private, community or public cloud types), often respectively implemented by different vendors. Each of the multiple clouds remains a separate and discrete entity, but the larger hybrid cloud architecture is bound together by standardized or proprietary technology that enables orchestration, management, and/or data/application portability between the multiple constituent clouds. In this approach, public cloud 105 and private cloud 106 are both part of a larger hybrid cloud.

In some respects, a system according to various implementations may include a processor and logic integrated with and/or executable by the processor, the logic being configured to perform one or more of the process steps recited herein. The processor may be of any configuration as described herein, such as a discrete processor or a processing circuit that includes many components such as processing hardware, memory, I/O interfaces, etc. By integrated with, what is meant is that the processor has logic embedded therewith as hardware logic, such as an application specific integrated circuit (ASIC), a FPGA, etc. By executable by the processor, what is meant is that the logic is hardware logic; software logic such as firmware, part of an operating system, part of an application program; etc., or some combination of hardware and software logic that is accessible by the processor and configured to cause the processor to perform some functionality upon execution by the processor. Software logic may be stored on local and/or remote memory of any memory type, as known in the art. Any processor known in the art may be used, such as a software processor module and/or a hardware processor such as an ASIC, a FPGA, a central processing unit (CPU), an integrated circuit (IC), a graphics processing unit (GPU), etc.

Of course, this logic may be implemented as a method on any device and/or system or as a computer program product, according to various implementations.

Figure 2:
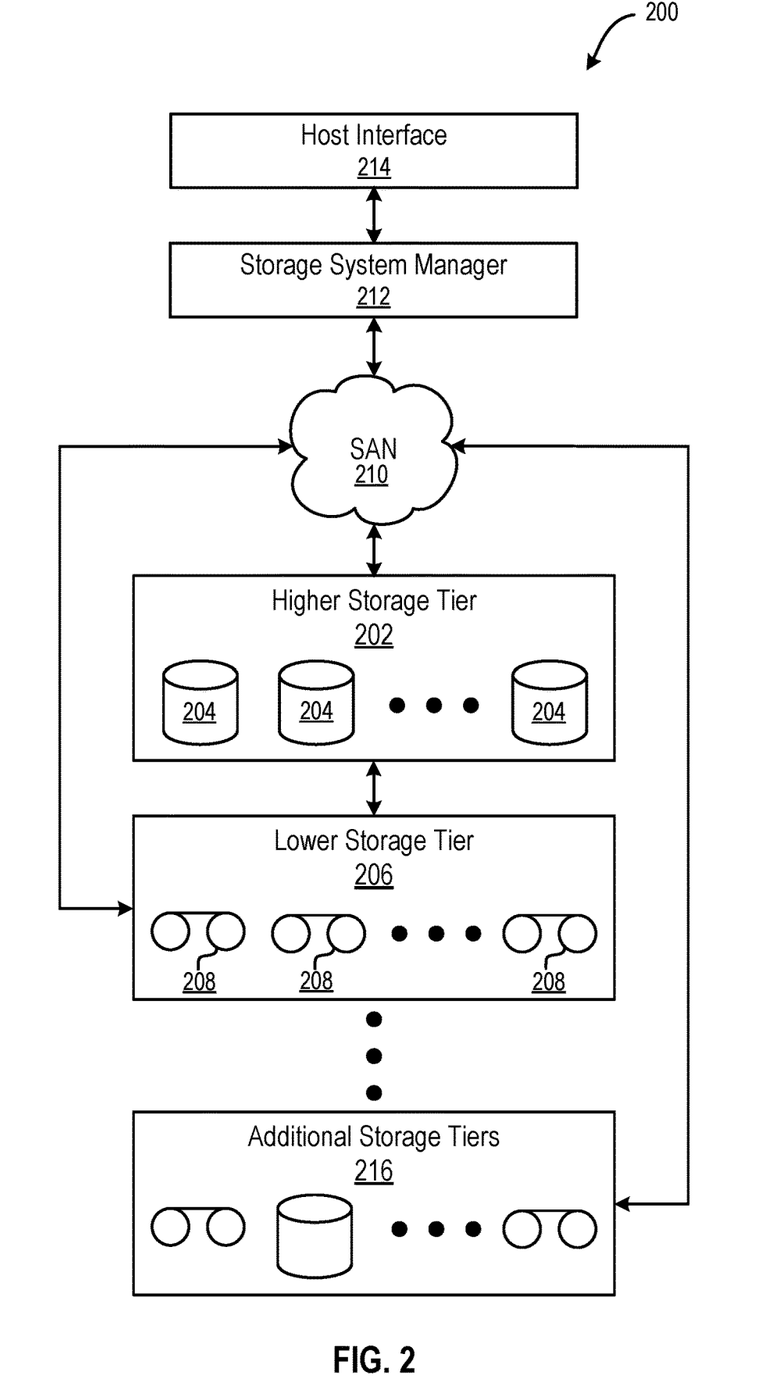
FIG. 2 is a diagram of a tiered data storage system, in accordance with one approach.

Now referring to FIG. 2, a storage system 200 is shown according to one approach. Note that some of the elements shown in FIG. 2 may be implemented as hardware and/or software, according to various approaches. The storage system 200 may include a storage system manager 212 for communicating with a plurality of media and/or drives on at least one higher storage tier 202 and at least one lower storage tier 206. The higher storage tier(s) 202 preferably may include one or more random access and/or direct access media 204, such as hard disks in hard disk drives (HDDs), nonvolatile memory (NVM), solid state memory in solid state drives (SSDs), flash memory, SSD arrays, flash memory arrays, etc., and/or others noted herein or known in the art. The lower storage tier(s) 206 may preferably include one or more lower performing storage media 208, including sequential access media such as magnetic tape in tape drives and/or optical media, slower accessing HDDs, slower accessing SSDs, etc., and/or others noted herein or known in the art. One or more additional storage tiers 216 may include any combination of storage memory media as desired by a designer of the system 200. Also, any of the higher storage tiers 202 and/or the lower storage tiers 206 may include some combination of storage devices and/or storage media.

The storage system manager 212 may communicate with the drives and/or storage media 204, 208 on the higher storage tier(s) 202 and lower storage tier(s) 206 through a network 210, such as a storage area network (SAN), as shown in FIG. 2, or some other suitable network type. The storage system manager 212 may also communicate with one or more host systems (not shown) through a host interface 214, which may or may not be a part of the storage system manager 212. The storage system manager 212 and/or any other component of the storage system 200 may be implemented in hardware and/or software, and may make use of a processor (not shown) for executing commands of a type known in the art, such as a central processing unit (CPU), a field programmable gate array (FPGA), an application specific integrated circuit (ASIC), etc. Of course, any arrangement of a storage system may be used, as will be apparent to those of skill in the art upon reading the present description.

In more approaches, the storage system 200 may include any number of data storage tiers, and may include the same or different storage memory media within each storage tier. For example, each data storage tier may include the same type of storage memory media, such as HDDs, SSDs, sequential access media (tape in tape drives, optical disc in optical disc drives, etc.), direct access media (CD-ROM, DVD-ROM, etc.), or any combination of media storage types. In one such configuration, a higher storage tier 202, may include a majority of SSD storage media for storing data in a higher performing storage environment, and remaining storage tiers, including lower storage tier 206 and additional storage tiers 216 may include any combination of SSDs, HDDs, tape drives, etc., for storing data in a lower performing storage environment. In this way, more frequently accessed data, data having a higher priority, data needing to be accessed more quickly, etc., may be stored to the higher storage tier 202, while data not having one of these attributes may be stored to the additional storage tiers 216, including lower storage tier 206. Of course, one of skill in the art, upon reading the present descriptions, may devise many other combinations of storage media types to implement into different storage schemes, according to the approaches presented herein.

According to some implementations, the storage system (such as 200) may include logic configured to receive a request to open a data set, logic configured to determine if the requested data set is stored to a lower storage tier 206 of a tiered data storage system 200 in multiple associated portions, logic configured to move each associated portion of the requested data set to a higher storage tier 202 of the tiered data storage system 200, and logic configured to assemble the requested data set on the higher storage tier 202 of the tiered data storage system 200 from the associated portions.

It follows that storage system 200 is able to use different types of memory to implement different levels of performance. For instance, the storage system manager 212 may be used to control where data is processed and/or stored in the system 200, where each location is capable of achieving a different performance level (e.g., outcome). Similarly, FIG. 3 below shows a distributed system 300 having different remote locations 304, 306 (e.g., user locations) that are connected to a central data storage location 302. Accordingly, structured logs and other information (e.g., commands, instructions, requests, metadata, etc.) can be sent between locations in a distributed data storage system, e.g., as described in further detail below.

As noted above, data production has continued to increase as computing power and the use of IoT devices advance. For instance, the rise of smart enterprise endpoints has led to large amounts of data being generated at remote locations. Data production will only further increase with the growth of 5G networks and an increased number of connected mobile devices. This issue has also become more prevalent as the complexity of machine learning models increases. Increasingly complex machine learning models translate to more intense workloads and increased strain associated with applying the models to received data.

In declarative computing environments such as Kubernetes, scenarios arise where it is beneficial for users to gather different logs of the computing environment. For example, log collections involve accumulating a variety of information into a structured format. However, accessing these log files is significantly limited and inefficient in conventional products. For instance, conventional products only provide access through a command line or file browser, which significantly limits a user's access to the information.

Conventional products thereby do not provide a viable interface for interacting with the resources. As a result, users experience limited insight into the corresponding environment. This drawback is only exacerbated by the aforementioned trends of increasing data production and workload sizes.

These conventional products are also unable to implement any specific tooling. Accordingly, access tooling from a user is unable to access information collected in logs for post-processing. Additionally, access tooling hardcodes specific resource types and is unable to process dynamic discovery information as a result. It follows that conventional systems have suffered from operational and performance based inefficiencies.

It follows that conventional systems have suffered from significant operational and performance based inefficiencies. In sharp contrast to these shortcomings experienced in conventional products, implementations herein are desirably able to interact natively with structured logs of a declarative computing environment. Implementations herein are thereby desirably able to reconstruct declarative computing environments using structured log collections. This allows for distributed systems to operate more efficiently than conventionally achievable by reducing compute overhead and latency associated with implementing one or more logs at a particular location. Implementations herein are thereby able to overcome storage based and processing based issues that have plagued conventional systems, e.g., as will be described in further detail below.

Figure 3:
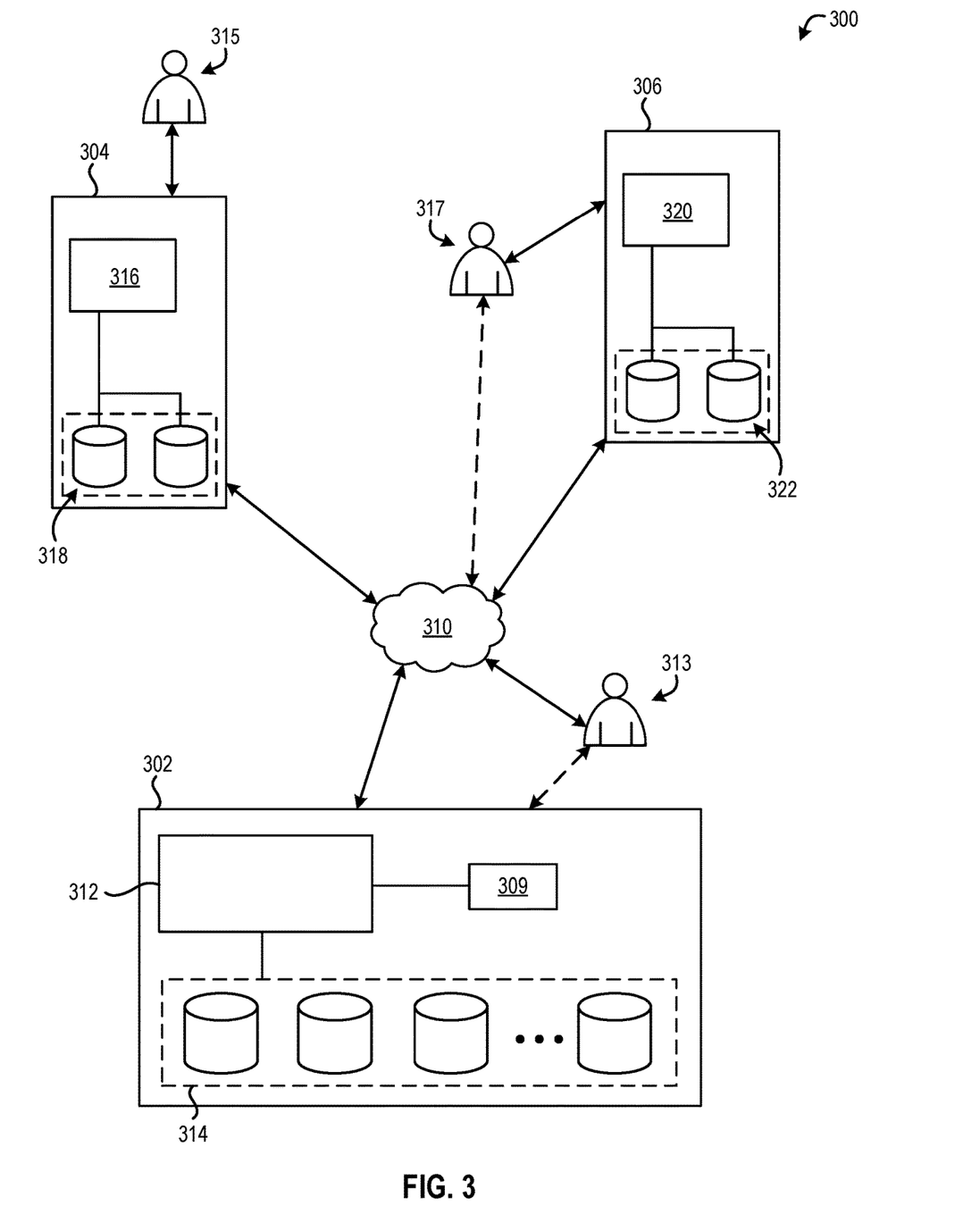
FIG. 3 is a representational view of a distributed system, in accordance with one approach.

Looking now to FIG. 3, a system 300, having a distributed architecture in accordance with one approach. As an option, the present system 300 may be implemented in conjunction with features from any other approach listed herein, such as those described with reference to the other FIGS., such as FIGS. 1-2. However, such system 300 and others presented herein may be used in various applications and/or in permutations which may or may not be specifically described in the illustrative approaches or implementations listed herein. Further, the system 300 presented herein may be used in any desired environment. Thus FIG. 3 (and the other FIGS.) may be deemed to include any possible permutation.

As shown, the system 300 includes a central data storage location 302 that is connected to a first user location 304 and a second user location 306. Specifically, the central data storage location 302 and user locations 304, 306 are connected to a network 310. The network 310 may be of any type, e.g., depending on the desired approach. For instance, in some approaches the network 310 is a WAN, e.g., such as the Internet. However, an illustrative list of other network types which network 310 may implement includes, but is not limited to, a LAN, a PSTN, a SAN, an internal telephone network, etc. As a result, any desired information, data, commands, instructions, responses, requests, etc. may be sent between the user locations 304, 306 and/or central data storage location 302, regardless of the amount of separation which exists therebetween, e.g., despite being positioned at different geographical locations.

It should also be noted that two or more of the user locations 304, 306 and/or central data storage location 302 may be connected differently depending on the approach. According to an example, which is in no way intended to limit the invention, two edge compute nodes may be located relatively close to each other and connected by a wired connection, e.g., a cable, a fiber-optic link, a wire, etc.; etc., or any other type of connection which would be apparent to one skilled in the art after reading the present description.

With continued reference to FIG. 3, the user locations 304, 306 may have a different configuration than the central data storage location 302. For example, in some implementations the central data storage location 302 includes a large (e.g., robust) processor 312 coupled to a cache 309 and a data storage array 314 having a relatively high storage capacity. The central data storage location 302 is thereby able to process and store a relatively large amount of data, allowing it to be connected to, and manage, multiple different remote user locations (e.g., edge node servers). For instance, the central data storage location 302 may store a complete copy of data for the system 300 which is updated in real-time. This central copy of data may thereby be used to satisfy at least some of the data requests that are received from the user locations 304, 306. Again, the central data storage location 302 may receive data, user information for authentication challenges, commands, etc., from any number of locations. The components included in the central data storage location 302 thereby may have a higher storage capacity and achievable throughput than components included in each of the user locations 304, 306 to accommodate the higher flow of data experienced at the central data storage location 302.

The central data storage location 302 may also store at least some information about the different user locations 304, 306 and/or users 315, 317, with user permission and ability to retract permission at any time. For instance, user defined authentication information (e.g., passwords), biometric information (e.g., resting heart rate), activity-based information (e.g., geographic location), etc., may be collected from the users 315, 317 over time, with user permission, and stored in memory for future use. Additionally, the information that is collected from the users may be hashed and randomized before being stored in memory in some approaches. For instance, some approaches include encrypting and storing biometrics, behavioral information, preferential selections, geographical location information, etc.

This information can later be recombined dynamically, and even at random in some approaches, to verify the identity of the individual attempting to perform a request (e.g., access certain data). Converting the information into a hashed and/or randomized form improves the security of the information received from the users, thereby avoiding unintentional exposure of private data and other sensitive information. Thus, as a system continues acquiring new information, verification parameters may be updated over time.

The user locations 304, 306 and/or the central data storage location 302 include declarative computing environments, e.g., such as Kubernetes, OpenShift, etc., in some implementations. It follows that scenarios arise over time in which it is beneficial to gather logs of the different operating environments at the different locations. For instance, a must-gather operation may be performed which involves collecting various API resources into a structured format.

Declarative computing environments like Kubernetes are tools which orchestrate infrastructure to handle changing workloads. The declarative computing environments are thereby able to scale containers across multiple machines, and replace failed machines with new machines. Using Kubernetes as an example, which is in no way intended to limit the invention, a system deployed on Kubernetes is called a cluster, and a control plane may be used to expose an API server that can handle internal and external requests to manage the cluster.

The cluster may include one or more worker machines (nodes), each of which is running a Kubelet which communicates back with the main control plane. Inside each node, multiple pods or "containers" work together such that, as a workload increases, Kubernetes can automatically scale horizontally by adding additional nodes to the cluster. In the process, Kubernetes takes care of complicated backend details, like networking, secret management, persistent storage, etc. Moreover, objects in Kubernetes are defined in yet another markup language (YAML), which may be used to describe the desired state of the cluster. This allows for a given environment to be reconstructed from logs collected using selective (customized) tooling that is able to collect and access desired information from the structured logs. Implementations herein are thereby able to represent the observed and desired state of the system at any given time.

However, conventional products suffer from significantly limited access to resources represented in YAML format (e.g., a .yaml file). As a result, conventional products have been unable to effectively access these log files, resulting in significant processing bottlenecks which have reduced efficiency of the conventional products. This is particularly apparent when attempting to utilize logs to reconstruct a given environment. For instance, conventional products are unable to provide a native interface for interacting with resources, and therefore are unable to gain insights into the respective environments. Again, in sharp contrast to these conventional shortcomings, implementations herein are desirably able to interact natively with structured logs of declarative computing environments like Kubernetes, e.g., as will be described in further detail below.

Referring still to FIG. 3, it follows that the processor 312 may use the cache 309 and/or storage array 314 to manage the information received and cause one or more operations to be performed. According to an example, the processor 312 at the central data storage location 302 may be used to perform one or more operations of method 400 in FIG. 4 below. It should also be noted that with respect to the present description, "information" may include any desired type of data. For instance, in different implementations information can include one or more structured logs. A structured log of information that is received may include a .tar file, a .zip file, a directory file, etc., or any other desired type of file (e.g., organization of data). For instance, in some approaches, a user's discovery cache may be received along with the structured log of information, e.g., as would be appreciated by one skilled in the art after reading the present description.

Moreover, while some implementations herein are described in the context of information corresponding to a user, this is in no way intended to be limiting. For instance, while a "user" is described in approaches herein as an individual, the user may actually be an application, an organization, etc. The use of "data" herein is in no way intended to be limiting either, and may include any desired type of details, e.g., such as physical data storage locations, logical data storage locations, logical to physical tables, data write details, etc.

With continued reference to FIG. 3, an administrator 313 of the central data storage location 302 and/or processor 312 itself is also shown as being connected to network 310. In some implementations, the administrator 313 may be directly connected to the central data storage location 302 as represented by the dashed arrowed line. It follows that the administrator 313 may be able to control at least a portion of the central data storage location 302. Users 315, 317 are also illustrated as being connected to the respective user locations 304, 306.

In some approaches, the users 315, 317 connect to their respective user locations 304, 306 through a compute device (e.g., such as the user's personal computer, mobile phone, etc.) such that information can be exchanged therebetween. However, in other approaches the users 315, 317 may be able to access the user locations 304, 306 using one or more terminals having a user interface. User 317 is also shown as being connected to the network 310 in some implementations (see dashed line). Accordingly, the user 317 may access user location 306 and/or other locations in system 300 through the network 310 in such implementations. In still other implementations, the users 315, 317 may be able to access network 310 through a direct connection to their respective user locations 304, 306.

The first user location 304 includes a processor 316 coupled to memory 318, and user location 306 includes a processor 320 coupled to memory 322. The memory implemented at each of the user locations 304, 306 may be used to store a variety of data and information received. Accordingly, one or more of the user locations 304, 306 may store at least some information associated with users 315, 317 and/or the user locations 304, 306 themselves. For instance, the user locations 304, 306 may also store structured logs that are used to maintain operation of the system 300 as a whole. For example, central data storage location 302 and/or user locations 304, 306 may maintain Kubernetes container logs, node logs, cluster (e.g., system component) logs, etc.

As noted above, these Kubernetes logs may be used in situations to reconstruct one or more computing environments. Accordingly, a Kubernetes log and the information therein may be received from one or more locations in the system 300. For example, a full set of Kubernetes logs may actually be stored at the central data storage location 302. One or more of these logs may thereby be received at either of the user locations 304, 306 to rebuild the given user location. It follows that the processors 316, 320 at the user locations 304, 306 are able to store one or more Kubernetes logs which may be used to cause one or more operations to be performed. In one example, either of the processors 316, 320 may be used to perform one or more operations of method 400 in FIG. 4 below.

As a result, implementations herein are desirably able to interact natively with structured logs of a declarative computing environment. Implementations herein are thereby able to reconstruct declarative computing environments using structured log collections. This allows for distributed systems to operate more efficiently than conventionally achievable by reducing compute overhead and latency associated with implementing one or more logs at a particular location. Implementations herein are thereby able to overcome storage based and processing based issues that have plagued conventional systems, e.g., as will soon become apparent.

Figure 4:
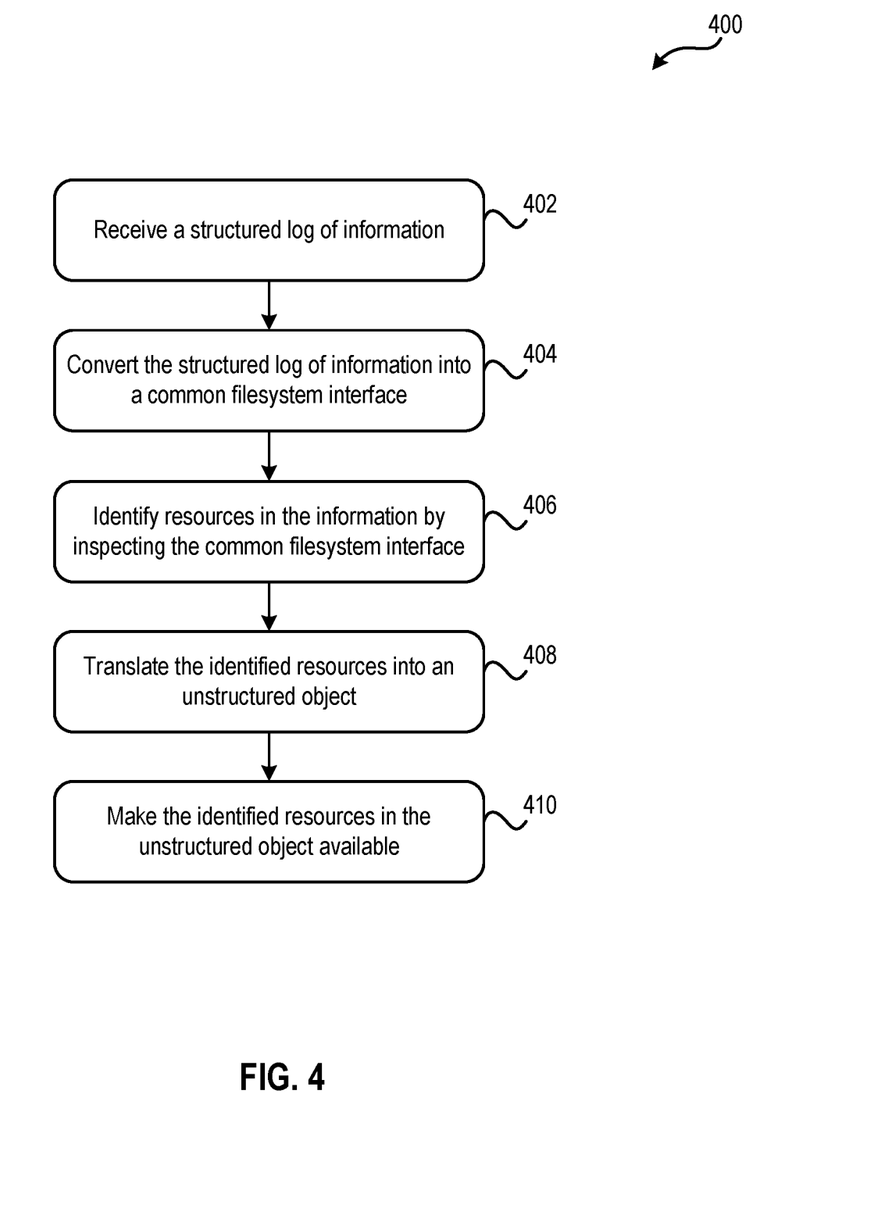
FIG. 4 is a flowchart of a method, in accordance with one approach.

Referring now to FIG. 4, a flowchart of a method 400 for viewing and debugging a container orchestration system cluster is shown according to one approach. Accordingly, method 400 may generally be implemented in order to reconstruct an environment from log collection. The method 400 may be performed in accordance with the present invention in any of the environments depicted in FIGS. 1-3, among others, in various approaches. Of course, more or less operations than those specifically described in FIG. 4 may be included in method 400, as would be understood by one of skill in the art upon reading the present descriptions.

Each of the steps of the method 400 may be performed by any suitable component of the operating environment. For example, in various approaches, the method 400 may be partially or entirely performed by a controller, a processor, a computer, etc., or some other device having one or more processors therein. Thus, in some approaches, method 400 may be a computer-implemented method. Moreover, the terms computer, processor and controller may be used interchangeably with regards to any of the approaches herein, such components being considered equivalents in the many various permutations of the present invention.

Moreover, for those approaches having a processor, the processor, e.g., processing circuit(s), chip(s), and/or module(s) implemented in hardware and/or software, and preferably having at least one hardware component may be utilized in any device to perform one or more steps of the method 400. Illustrative processors include, but are not limited to, a central processing unit (CPU), an application specific integrated circuit (ASIC), a field programmable gate array (FPGA), etc., combinations thereof, or any other suitable computing device known in the art.

As shown in FIG. 4, operation 402 of method 400 includes receiving a structured log of information. While information may be maintained and even received as a structured log, information presented in this format is difficult to access and inspect. For instance, accessing information in a structured log may be limited to a command prompt, which significantly limits how information in the log may be used. Accordingly, operation 404 includes converting the structured log of information into a filesystem interface. In some approaches, the filesystem interface is a common type. For instance, the filesystem interface may be shared among users, locations, applications, etc. However, the filesystem interface may be of any desired type.

As noted above, a structured log may be received in different formats, e.g., depending on the approach. For instance, the structured log may be a .tar file, a .zip file, a directory file, etc. Additional information may also be received with and/or in the structured log. In other words, a discovery cache may be received from a given location, along with the structured log of information received in operation 402.

For example, in some approaches a discovery cache associated with a particular user may be collected and received from a user's location along with the structured log to provide operational resources beyond basic use cases. In these approaches, the discovery cache may be used to determine a short-name, a long-name, a category, etc., for various resources identified in the structured log. Implementations herein can thereby utilize information received in a discovery cache from the user location, to reference identified resources in the structured node. Moreover, these identified resources may be referenced as desired, e.g., by their respective short-names, long-names, categories, etc., because of the customization the information received in the discovery cache is able to achieve. This allows users the ability to specify long-names having long forms (e.g., "oc get pods") and short-names having short forms (e.g., "oc get po") on a command line.

It should be noted that with respect to the present description, the "discovery cache" includes memory that stores parameters which impact how discovery is performed. Receiving the discovery cache thereby also allows for resources to be grouped together in some implementations. For example, exemplary approaches use the discovery cache to determine object subresources and additionally serve those subresources by parsing them out of existing files (e.g., .yaml files) in response to determining that one or more subresources are available, e.g., as would be appreciated by one skilled in the art after reading the present description.

Again, operation 404 includes processing the structured log into a common filesystem interface. Implementations herein are desirably able to overcome conventional shortcomings by achieving a native interface with structured logs. This is achieved in some approaches using a same API technology used to access the resources in production environments. Accordingly, implementations herein may receive one or more logs (e.g., archives) as inputs, and decode the logs such that they may be more easily interpreted, e.g., as described in further detail below.

From operation 404, method proceeds to operation 406 in response to converting the structured log into a common filesystem interface. There, operation 406 includes identifying resources in the information by inspecting the common filesystem interface. In other words, operation 406 includes inspecting the entries in the common filesystem interface formed in operation 404, to identify resources therein. Each of the entries in the common filesystem interface may be inspected by progressing from one entry to the next in an iterative fashion. The entries may be inspected in a predetermined order in some instances, but the entries may be inspected randomly, as instructed, in response to a predetermined condition being met (e.g., an entry being of a certain size and/or type), etc.

The type(s) of resources identified from the information in the common filesystem interface entries may vary depending on the implementation. For instance, in some approaches the resources identified include YAML extension files which are identified from the information by progressing through (e.g., scraping) the common filesystem interface entries. YAML extension files may be identified as potential resources that should at least be inspected further and/or supported.

In some approaches, the resources identified from the common filesystem interface include printer column data formats that are gleaned from the entries that are inspected. In situations where printer column data formats are determined, the formats may be used to host any identified resources with the same column formats as the native (e.g., original) cluster. This improves the process of identifying and applying the resources that are identified from a structured log originally received.

It follows that in some approaches, each entry in the common filesystem interface may be inspected for resources. In other approaches, a predetermined number of resources may be identified. Thus, after identifying a predetermined number of resources, a remainder of the common filesystem interface entries may not be inspected in some approaches. In still other approaches, entries in the common filesystem interface may be inspected a predetermined number of times until a desired number of resources have been identified. In still other approaches, the entries in a common filesystem interface may not include a desired number of resources therein. Accordingly, resources identified in one common filesystem interface may be merged with resources identified in a subsequent and/or previous common filesystem interface.

From operation 406, method 400 proceeds to operation 408. There, operation 408 includes unmarshalling the identified resources into an unstructured object. The unmarshalling is performed by translating the identified resources into a different format. In other words, operation 408 includes unmarshalling (e.g., translating) the identified resources into an easily accessible format by decoding the identified resources.

The process of unmarshalling the identified resources may also reveal desired information about the identified resources. For example, unmarshalling an identified resource may reveal a GVK identifier and/or a namespace identifier of the respective resource. Marshalling (or marshaling) includes transforming the representation of an object in memory, into a data format more suitable for storage and/or transmission. Marshalling particular information (e.g., like the identified resources) thereby results in that information being more easily accessible and therefore more useable.

In some approaches, the resources are API resources that are defined in YAML. Unmarshalling the resources identified in the common filesystem interface may thereby include using a YAML marshaller (or unmarshaller). In other words, resources may be translated into a more easily accessible format by unmarshalling the identified portion of the information in the common filesystem interface using a YAML based marshaller and/or unmarshaller. Moreover, shortname support may be implemented by parsing specific header fields from a table output. Short-name support is thereby provided by a well-formed file). In other approaches, the structured log received may be configured as a .json file. Unmarshalling the resources identified in the common filesystem interface may thereby include using a .json unmarshaller. In other words, resources may be translated into a more easily accessible format by unmarshalling the identified portion of the information in the common filesystem interface using a .json based marshaller and/or unmarshaller.

In still further approaches, the structured log received is a collection of information from an etcd key-value store. In other words, a key-value store may be used to hold the resources. Accordingly, a tool (e.g., microprocess) configured to interact (e.g., interface) with etcd storage format(s) may be implemented, e.g., as would be appreciated by one skilled in the art after reading the present description.

The unmarshalled resources are used to convert the structured log that was originally received, into information that is presented in a hostable format. Moreover, the information that supports this may be stored in memory, on disk, etc. Accordingly, an API service may be implemented to provide a user access to the unmarshalled resources. For instance, a rest API may be supported by the data (e.g., unmarshalled resources) from the structured log originally received in operation 402. In one example, which is in no way intended to limit the invention, data may be hosted using a Kubernetes API service which allows existing Kubernetes commands, go tools, etc., to function properly while directly accessing the data derived from the originally received structured log.

Again, implementations herein are able to improve performance by viewing and debugging a container orchestration system cluster. This provides users the ability to interface natively with artifacts of a log file. For example, a user is able to select pods using a label selector, which is not achievable in conventional products. Again, conventional products only provide simple command line manipulation of received data, and offer significantly less insight into the data. As a result, conventional products have suffered from significant inefficiencies while attempting to reconstruct a declarative computing environment using a structured log collection. A significant number of commands are issued and performed on available information in conventional products. In sharp contrast, implementations herein are able to overcome these conventional shortcomings by allowing for tooling to be used as if it were a regular cluster (e.g., in a "read" mode), e.g., as would be appreciated by one skilled in the art after reading the present description.

Referring still to FIG. 4, operation 410 thereby includes making the identified resources in the unstructured object available by mapping the unmarshalled resources. In other words, operation 410 involves making the unmarshalled resources originally identified from the structured log available for access. Some implementations involve integrating the mapping with any APIs that have also been established to provide access to the translated resources. In other words, one or more APIs may be configured to interface with (e.g., use) the mapped translated resources. It follows that with respect to the present description, "mapping" the unmarshalled (e.g., translated) resources involves organizing and presenting the resources in a particular way.

As noted herein the organization of the unmarshalled resources in a mapped configuration may differ based on the type of resources, a type of file the resources were identified in, etc. While organization may vary, implementations herein are desirably able to map the resources in unmarshalled (e.g., translated form), thereby allowing for the identified resources to be identified, accessed, viewed, saved, etc.

In some approaches, the translated resources may be mapped such that the resources are organized according to a particular system (e.g., scheme). For instance, the translated resources are organized in some implementations according to a respective GVK identifier. In other implementations, the translated resources are organized according to a namespace identifier of each of the respective resources.

In some implementations, the structured log includes metadata that indicates how a resulting resource file is to be mapped (e.g., hosted). Thus, once the resources of the structured logs are identified and translated, the metadata may be used to determine how to map a given resource file. In one example, a resource file is mapped by being cluster scoped using processes which would be apparent to one skilled in the art after reading the present description. In another example, mapping the file may include causing the file to be namespaced using processes which would be apparent to one skilled in the art after reading the present description.

It follows that the operations of method 400 are desirably able to interact easily and efficiently with structured logs of a declarative computing environment. Implementations herein are thereby able to reconstruct declarative computing environments using structured log collections. This allows for distributed systems to operate more efficiently than conventionally achievable by reducing compute overhead and latency associated with implementing one or more logs at a particular location. Implementations herein are thereby able to overcome storage based and processing based issues that have plagued conventional systems.

According to an in-use example, which is in no way intended to limit the invention, a declarative computing environment implemented at a user location of a distributed system (e.g., see system 300 of FIG. 3) may have suffered a failure. To recover (e.g., rebuild) the failed declarative computing environment at the user location, one or more structured logs may be received from storage (e.g., see central data storage location 302 of FIG. 3). For example, a .tar file may be received.

In response to receiving the .tar file, a discovery procedure is initiated which is used to inspect the .tar file and identify desired portions of the information received in the .tar file. In some approaches, the desired portions of the information include API resources that are identified in the information received in the .tar file. The identified information (e.g., resources) may further be decoded (e.g., unmarshalled) into an unstructured object. As these unstructured objects are accumulated, they may be mapped and used to develop a resulting file that can be exported as a Kubernetes configuration file.

This allows a server to operate on a local host system, such that users are directed to the appropriate server to identify resources in a set of received information (e.g., a sample .tar file). This is supported by memory in the server, but could be supported by memory of a processor, memory of an existing filesystem, by a remote database where config files are loaded into, etc. Accordingly, implementations herein present a native way to interact with the debug data and reconstruct a given environment. While these reconstructed environments are limited to data read operations in some implementations, access to the data significantly improves reconstruction efforts for declarative computing environments, e.g., as described herein.

Once again, approaches herein are desirably able to interact easily and efficiently with structured logs of a declarative computing environment. Implementations herein are thereby able to reconstruct declarative computing environments using structured log collections. This allows for distributed systems to operate more efficiently than conventionally achievable by reducing compute overhead and latency associated with implementing one or more logs at a particular location. Implementations herein are thereby able to overcome storage based and processing based issues that have plagued conventional systems.

Certain aspects of the implementations described herein may further be improved as a result of implementing one or more machine learning models. These machine learning models may be trained to generate the preferred order in which a filesystem tree is traversed to identify resources in a structured log received. For instance, a machine learning model (e.g., a neural network, deep learning model, Naïve Bayes classifier, logistic regression, k-means clustering, etc.) may be trained using labeled and/or unlabeled data corresponding to past performance of a distributed system implementing any of the processes described herein. Over time, the machine learning model may thereby be able to identify details unique to different types of structured logs perform and are processed while reconstructing declarative computing environments, e.g., such as Kubernetes. This understanding will allow the machine learning model to determine an ideal process (e.g., order) of evaluating a structured log. The machine learning model achieves this by balancing complexity of the structured log, with one or more similarity scores with previously evaluated structured logs, e.g., as would be appreciated by one skilled in the art after reading the present description.

It should again be noted that implementations herein may use APIs. In addition to providing improved access to unstructured data for users as described above, APIs may be configured to collect the outputs (e.g., vectors) of a machine learning model layer that are to be used as an input for a subsequent layer of a process, e.g., such as a machine learning model. Accordingly, the API can accomplish a seamless transition of data between the layers in edge servers and the central server. APIs may thereby be used to help facilitate the movement of data and flow of a method, e.g., as would be appreciated by one skilled in the art after reading the present description.

It will be clear that the various features of the foregoing systems and/or methodologies may be combined in any way, creating a plurality of combinations from the descriptions presented above.

It will be further appreciated that embodiments of the present invention may be provided in the form of a service deployed on behalf of a customer to offer service on demand.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A computer-implemented method, comprising:
receiving a structured log of information, wherein the structured log of information received is selected from the group consisting of: a .tar file, a .zip file, and a directory file, wherein a discovery cache is received along with the structured log of information;
converting the structured log of information into a filesystem interface;
identifying resources in the information while progressing through the filesystem interface, by:
inspecting portions of the filesystem interface,
identifying YAML extension files while progressing through the portions of the filesystem interface, and
in response to identifying a predetermined number of YAML extension files, ignoring a remainder of the portions of the filesystem interface;
use the discovery cache to determine subresources corresponding to the identified resources;
translating the identified resources and subresources into an unstructured object by unmarshalling the identified resources and subresources;
making the unstructured object available by mapping the unmarshalled resources and subresources; and
using the discovery cache to determine a short-name and category for each of the identified resources and subresources.

2. The computer-implemented method of claim 1, wherein identifying resources in the information by inspecting the filesystem interface includes:
identifying column data formats in the information,
wherein the unmarshalled resources have same column data formats as a native cluster.

3. The computer-implemented method of claim 1, wherein mapping the translated resources includes organizing the translated resources by a respective group version kind (GVK) identifier, a respective namespace identifier, or a respective GVK identifier and a respective namespace identifier.

4. The computer-implemented method of claim 1, wherein making the unstructured object available includes:
hosting an application programming interface (API) service configured to provide a user access to the unmarshalled resources.

5. The computer-implemented method of claim 1, wherein identifying resources in the information includes identifying YAML extension files in the information by progressing through the filesystem interface.

6. A computer program product, comprising a computer readable storage medium having program instructions embodied therewith, the program instructions readable by a processor, executable by the processor, or readable and executable by the processor, to cause the processor to:
   receive a structured log of information and a corresponding discovery cache;
   convert the structured log of information into a filesystem interface;
   identify resources in the information by inspecting the filesystem interface;
   use the discovery cache to determine subresources corresponding to the identified resources;
   in response to determining that one or more subresources are available, parsing the available subresources from respective existing files, wherein the subresources include YAML extension files and/or printer column data formats;
   translate the identified resources and subresources into an unstructured object by unmarshalling the identified resources and subresources; and
   make the unstructured object available by mapping the unmarshalled resources.

7. The computer program product of claim 6, wherein mapping the translated resources includes organizing the translated resources by a respective group version kind (GVK) identifier, a respective namespace identifier, or a respective GVK identifier and a respective namespace identifier.

8. The computer program product of claim 6, wherein making the unstructured object available includes:
   hosting an application programming interface (API) service configured to provide a user access to the unmarshalled resources.

9. The computer program product of claim 6, wherein identifying resources in the information includes identifying YAML extension files in the information by:
   progressing through the filesystem interface;
   identifying resources in the filesystem interface; and
   in response to determining that a number of resources in the filesystem interface is outside a predetermined range, merging the resources identified in the filesystem interface with resources identified in subsequent and/or previous filesystem interfaces.

10. The computer program product of claim 6, wherein the structured log of information received is selected from the group consisting of: a .tar file, a .zip file, and a directory file
   wherein the resources include YAML extension files and/or printer column data formats, wherein the subresources include select subsets of the YAML extension files and/or printer column data formats.

11. The computer program product of claim 10, wherein the program instructions are readable and/or executable by the processor to cause the processor to:
   use the discovery cache to determine a short-name and category for each of the identified resources.

12. The computer program product of claim 8, wherein identifying resources in the information by inspecting the filesystem interface includes:
   identifying column data formats in the information,
   wherein the unmarshalled resources have same column data formats as a native cluster.

13. A system, comprising:
a processor; and
logic integrated with the processor, executable by the processor, or integrated with and executable by the processor, the logic being configured to:
   receive a structured log of information and a corresponding discovery cache;
   convert the structured log of information into a filesystem interface;
   identify resources in the information while progressing through the filesystem interface, by:
      inspecting portions of the filesystem interface,
      identifying YAML extension files while progressing through the portions of the filesystem interface, and
      in response to identifying a predetermined number of YAML extension files, ignoring a remainder of the portions of the filesystem interface;
   use the discovery cache to determine subresources corresponding to the identified resources;
   use the discovery cache to determine short-names and/or categories for the respective resources and subresources;
   translate the identified resources and subresources into an unstructured object by unmarshalling the identified resources and subresources; and
   make the unstructured object available by mapping the unmarshalled resources.

14. The system of claim 13, wherein mapping the translated resources includes organizing the translated resources by a respective group version kind (GVK) identifier, a respective namespace identifier, or a respective GVK identifier and a respective namespace identifier.

15. The system of claim 13, wherein making the unstructured object available includes:
   hosting an application programming interface (API) service configured to provide a user access to the unmarshalled resources.

16. The system of claim 13,
   wherein the subresources include select ones of the identified YAML extension files.

17. The system of claim 13, wherein the structured log of information received is selected from the group consisting of: a .tar file, a .zip file, and a directory file, wherein a discovery cache is received along with the structured log of information, wherein the resources include YAML extension files and/or printer column data formats, wherein the subresources include select subsets of the YAML extension files and/or printer column data formats.

18. The system of claim 13, wherein identifying resources in the information by inspecting the filesystem interface includes:
   identifying column data formats in the information,
   wherein the unmarshalled resources have same column data formats as a native cluster.

19. The computer-implemented method of claim 1, wherein identifying resources in the information by inspecting the filesystem interface includes:
   in response to determining that a number of resources in the filesystem interface is outside a predetermined range:
      merging the resources identified in the filesystem interface with resources identified in subsequent and/or previous filesystem interfaces, and
      re-progressing through the filesystem interface; and
   in response to determining that a number of resources in the filesystem interface is inside the predetermined range, ignoring a remainder of the filesystem interface.

* * * * *